July 14, 1931. F. HART 1,814,310
METHOD OF REPRODUCING MULTICOLOR DESIGNS
Filed Jan. 3, 1928  3 Sheets-Sheet 1

INVENTOR.
Frank Hart
ATTORNEY.

July 14, 1931.  F. HART  1,814,310
METHOD OF REPRODUCING MULTICOLOR DESIGNS
Filed Jan. 3, 1928   3 Sheets-Sheet 2

INVENTOR.
Frank Hart
ATTORNEY

July 14, 1931. F. HART 1,814,310
METHOD OF REPRODUCING MULTICOLOR DESIGNS
Filed Jan. 3, 1928  3 Sheets-Sheet 3

INVENTOR.
Frank Hart
BY
ATTORNEY.

Patented July 14, 1931

1,814,310

UNITED STATES PATENT OFFICE

FRANK HART, OF LOS ANGELES, CALIFORNIA

METHOD OF REPRODUCING MULTICOLOR DESIGNS

Application filed January 3, 1928. Serial No. 244,334.

This invention relates to methods of making multicolored posters and the like from a colored original by means of the well known silk screen process, in which paint is forced through the screen for applying a design on a suitable receiving surface duplicating that on the colored original.

The principal object of this invention is to provide an improved method for reproducing a design from a colored original which will facilitate the several steps of the method and expedite the work by reason of the fact that exactitude and accuracy in the reproduction of the details and outlines and the provision of color separation lines is unnecessary.

Another object is to provide an improved means and method for the purpose stated which embodies the production of a single tracing of the several colors from the colored original, in succession, so that all of the features of the design will be on a single sheet, the provision of a single negative made from said tracing, and the production of separate screens, or stencils, by suitable means, from said negative, in succession. In order to practice the above named method certain colors are blocked out on the single negative, one after the other, and a screen is made therefrom after each blocking out operation; also certain colors are blocked out on each of the screens after the designs are printed thereon. Thus at the completion of the method there will be provided a separate screen for each of the colors on the original.

A further object is to provide an improved method for the purpose stated which will lend itself to any predetermined color sequence, provided the same sequence is maintained throughout the several steps of the method. Other objects may appear as the description of my invention progresses.

I have shown in the accompanying drawings a preferred technique, subject to modification within the scope of the appended claims without departing from the spirit of my invention. In said drawings:

Figure 1:
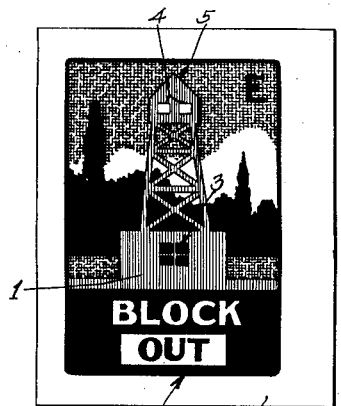
Fig. 1 is a plan view of a subjective design, herein referred to as a colored original, on which the several colors are represented by differently shaded sections.

The first step in the reproduction of the colored original O as shown in Fig. 1 is to prepare a tracing T (see Fig. 2) on a sheet $t$ of tracing paper or other suitable transparent material of all the features of the design shown in the colored original O. This is done in the usual manner by placing the sheet of material $t$ over and in close contact with the card C on which the original O is made.

Figure 2:
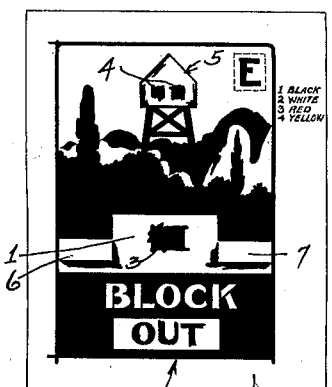
Fig. 2 represents a positive tracing on transparent paper, made from the colored original shown in Fig. 1 and showing the outlines of the several features of the design but crudely copied.

The first step in the formation of the tracing T is to entirely cover up and form a solid, opaque coating over all portions of the tracing overlying the color on the original O which is to be first printed in accordance with the previously determined color sequence. It is desirable to print on the sheet $t$ at one side of the tracing T a selected color order, as shown in Fig. 2. In this particular case the color sequence, i. e. the order in which the colors are to be printed is as follows: black, white, red and yellow, said colors being embodied in the colored original O of Fig. 1 and indicated differently. For instance black is shown on the original in solid black, white is shown as such, red is indicated by vertical shade lines, and yellow is indicated by horizontal and vertical broken shade lines.

It may be understood at this point however, that the above color sequence is only illustrative and is not compulsory, as any other color order may be observed and practiced with equal results.

The second step in forming the tracing T is to similarly opaque all portions of the tracing which overlie the second color of the predetermined color order on the colored original, which is white except at the junctions between the first and second color areas. This is followed in succession by tracing in opaque paint on the sheet $t$ those portions of the original O which are covered, respectively, by the other colors, namely, red and yellow. Thus when the tracing T is completed, it will embrace all colored portions of the design of the original. In the production of the tracing T it is not necessary to provide color separation lines, as in other well known methods, but care must be practiced in forming the tracing so as to prevent the paint covering one color from abutting or overlapping that of another color at the junction lines of said colors thus preventing a completely opaque tracing (see Fig. 2). Exceptions to this rule may be made, depending upon the character and simplicity of the designs and the color schemes.

Referring to Fig. 2, it will be observed that there are no color separation lines and that the several color portions of the tracing do not abut or overlap except that the lower portion of the tower above the base 1, both abuts and overlaps the two colors black and white, over which the tower base extends. This portion of the tower 2 does not appear on the tracing T and only the colors which are behind the said portion show. Said portion however appears later, on the negative N shown in Fig. 4.

This deviation from the general rule is not necessary but indicates the possibility of exceptions to the rule when the same are desirable or advantageous. The tracing T, as shown in Fig. 2, shows the lettering and details which must necessarily be exactly and accurately reproduced purposely crude and unfinished, and the apaque paint employed in forming the tracing is extended beyond its ordinary limits in every case. See particularly the words "Block" and "Out", the windows 3 in the base 1 of the tower and the windows 4 in the top 5 of the tower, and the junction lines between the base 1 of the tower and the portions 6 and 7.

Figure 3:
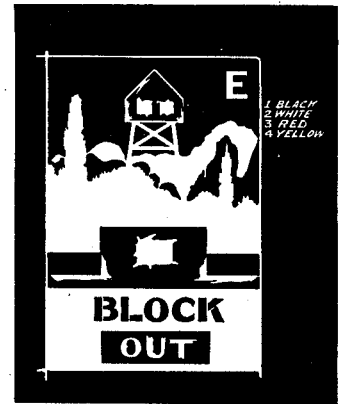
Fig. 3 shows a Van Dyke negative made by a contact printing process from the single color tracing shown in Fig. 2.

The next step in the method after the completion of the crudely finished tracing T is the production of the negative N shown in Fig. 3, which is done preferably by what is known as the Van Dyke process of contact printing. The negative is made by supporting the tracing T in close contact with a sheet of sensitized Van Dyke paper and exposure to the light for a short time, after which the negative is washed and fixed, leaving the portions thereof which correspond to the opaque portions of the tracing transparent, and the portions opaque which correspond to the transparent portions of the tracing. The negative N is the only negative made in the practice of my method, others being unnecessary by reason of the fact that this single negative is blocked out, as hereinafter described, step by step, as the succeeding screens are made for the different colors in order.

When the negative is completed and thoroughly dry it is preferably pressed flat on a suitable surface and coated on both sides with lacquer—usually with several coats—so that the negative paper will be impervious to water and water color which is later applied thereto in the blocking out steps, thus preventing the warping, stretching, shrinking and buckling of the paper, and making it possible to obtain substantially perfect registration and uniformity in the reproduction of the design of the original O. This operation is very important so that no change in size or distortion of the design will be possible which will affect the designs on the screens to be later developed from the negative.

Figure 4:
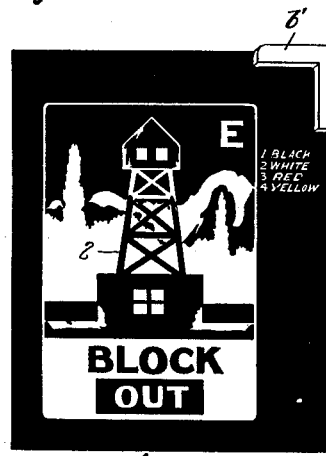
Fig. 4 illustrates a Van Dyke negative shown in Fig. 3 after the same has been retouched so as to provide clear and sharp outlines to some of the features of the design, together with means attached to one corner of the negative, for registering the stencils properly with the design on the negative.

The negative N of Fig. 3 is now retouched at points in order to cure defects purposely made in the formation of the tracing T, and the effect of the retouching operation is clearly indicated in Fig. 4. It will be observed that the windows 3 and 4 of the tower are now clearly defined on the negative by retouching with opaque paint and the outlines of the letters of the words "Block" and "Out" are likewise made clear and sharp by the same means.

In the last mentioned step of the method the negative is treated so that portions thereof which correspond to the portions on the tracing T that do not show for the reason that certain underlying and overlying colors were allowed to abut or overlap each other, will be opaque, as shown in Fig. 4. In this connection reference is made particularly to the lower portion of the tower which overlies the black and white of the colored original and does not show in the crude negative of Fig. 3. Said portion of the tower in the retouched negative, however, clearly shows in opaque lines so that the completed tower structure will print in the production of the screens in the ensuing steps of the method.

Reverting to the formation of the tracing T it may be observed that the letter "E" at the upper right hand corner of the tracing was preferably applied by stripping or attaching the same by means of a piece of transparent adhesive material with said letter formed thereon. Said letter may have been cut from a previously developed negative and is applied as stated for the purpose of economy in labor.

Figure 5:
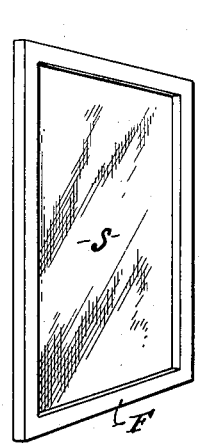
Fig. 5 is a perspective view of a suitable form of screen or stencil consisting of a sheet of bolting cloth stretched taut over a wooden frame, in readiness for imprinting designs thereon.

When all corrections are made on the crude negative N the paint thereon is allowed to dry and the same is treated with additional coats of clear lacquer so that the negative may be repeatedly painted with water color if necessary and thoroughly cleansed with water after each application of lacquer without distortion of the design thereon. When dry the negative N may be employed for the successive production of the screens S as shown in Fig. 5, and in order to facilitate the printing operations I preferably provide the negative at one corner with a register block B having right angularly disposed arms $b$ and $b'$ disposed in the planes of the vertical and horizontal margins of the negative.

The screens S which are made of silk bolting cloth, varnished and sensitized, are usually stretched taut over a wooden frame F composed of right angularly disposed rails, with the screen cloth attached to the backs of said rails. Thus the frame F may be positioned on the negative N by placing one corner of the frame in engagement with the block B. The positioning of successive screens of the same size in contact with the negative N will insure the position of the design of the colored original in the same approximate positions on the screens, so that nicety in the registration of the screens and negatives is eliminated.

Figure 6:
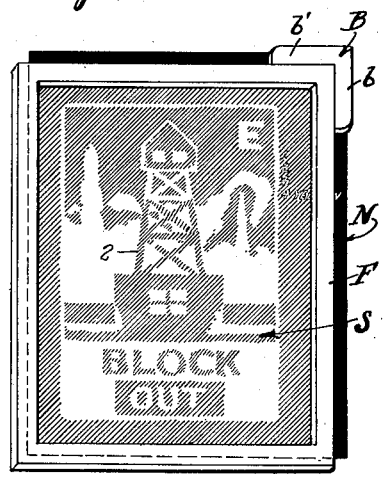
Fig. 6 shows the stencil illustrated in Fig. 5 superposed on and in close contact with the negative shown in Fig. 4, preparatory to imprinting the design of the negative thereon.

As shown in Fig. 6 the screens S are placed on and in contact with the negative N for the purpose of transferring by contact printing means the design of the negative to the screens. The production of the successive color screens, however, is done in the reverse of the color sequence. Thus, the first screen S made is for the yellow color, the second for red, the third for white and the last for black.

Figure 7:
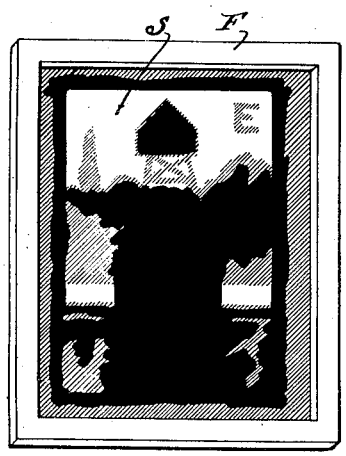
Fig. 7 is a view of a stencil after the design of the negative has been printed thereon and certain portions of the design on the stencil have been blocked out so as to render the stencil pervious only to the last color of the sequence.
Figure 8:
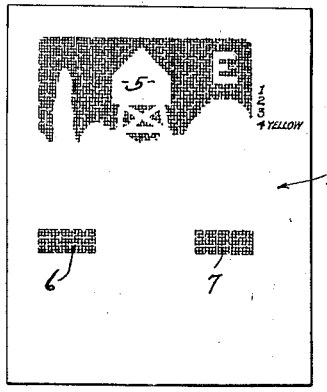
Fig. 8 shows a print from the retouched screen of Fig. 7.

When the positive print of the design is made on the first screen S, the screen may be positioned on and in registration with the design of the colored original O and all colors, except yellow, which are visible through the screen are blocked out in impervious paint, as shown in Fig. 7. The portions of the negative N which are opaque will provide pervious portions on the screen S, and those portions of the negative which are transparent will provide impervious portions on the screen. Thus, the screen S which is first made will be pervious to paint only over such portions of the area thereof which show as white in Fig. 7, and such portions correspond to the yellow of the colored original, as indicated by a print P taken from the screen S and shown in Fig. 8.

Figure 9:
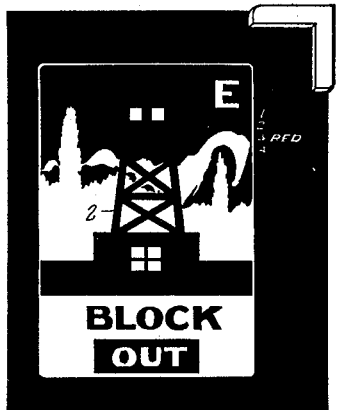
Fig. 9 shows the negative with certain portions blocked out preparatory to printing the stencil for the third color of the sequence.

Following the completion of the positive screen S for the color yellow the negative N is next blocked out by opaquing all portions thereof which correspond on the colored original O to the colors yellow and red, as shown in Fig. 9. From said negative a positive print is then made on another screen S', by contact printing means, and those portions of the negative which are opaque will be pervious on the screen to paint and those portions of the screen corresponding to the transparent portions of the negative will be impervious to paint.

Figure 10:
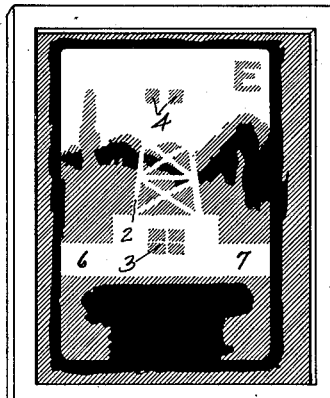
Fig. 10 shows the completed stencil with certain portions blocked out for printing the third color of the sequence.
Figure 11:
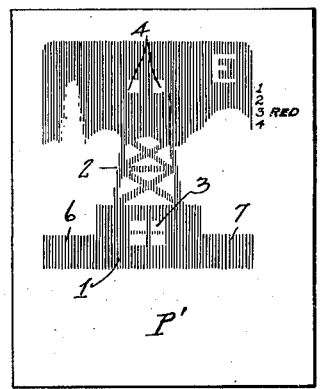
Fig. 11 shows a print from the completed stencil of Fig. 10.

It is necessary, however, before the completion of the screen for use to block out in opaque paint on the screen the portions corresponding to the black and white areas of the colored original, so that, as shown in Fig. 10, the pervious portions of the screen S' will represent only the red and yellow areas of the original which are indicated by a print P' made from the screen S'.

Figure 12:
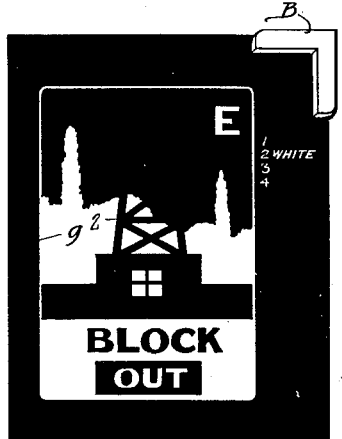
Fig. 12 shows the negative blocked out for producing the stencil for the second color of the sequence.
Figure 13:
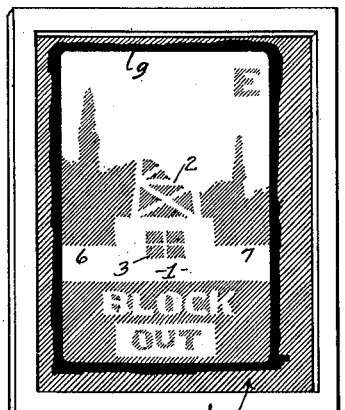
Fig. 13 shows the completed stencil made from the negative of Fig. 12 with portions blocked out for producing the second color of the sequence.
Figure 14:
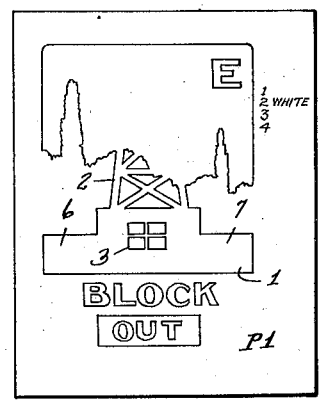
Fig. 14 shows a print from the stencil shown in Fig. 13.

The next step consists in blocking out on the negative N, all portions thereof, except those represented by the black areas of the the colored original and those portions of the tower where the red overlies the black, as shown in Fig. 12. Thereafter the screen S1 for the color white is made by contact printing from the negative N of Fig. 12, and the remaining black area, now consisting only of the marginal rectangular line 9, is blocked out in impervious paint on the screen S1, as shown in Fig. 13, so that a print made therefrom would appear as shown in Fig. 14 at P1. The screen S1 in such case would be pervious to paint only in such areas as are covered by white, yellow and red in the colored original.

Figure 15:
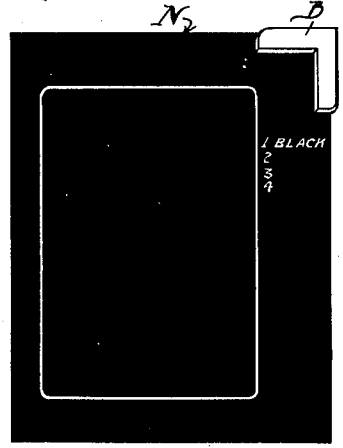
Fig. 15 shows the negative blocked out for producing a screen for printing the first color of the sequence.
Figure 16:
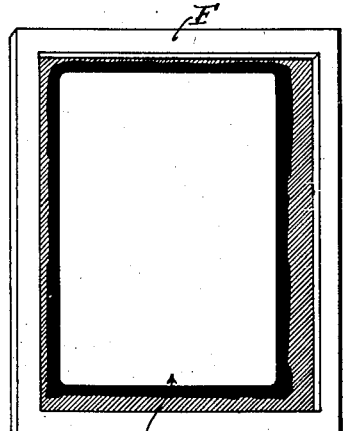
Fig. 16 represents a stencil made from the negative of Fig. 15 for printing the first color of the sequence.

The last step in the method consists in blocking out all of the remaining area of the negative N except the marginal line 9, as shown in Fig. 15. This is followed by the reproduction of a screen S2 for the color black, as shown in Fig. 16, leaving the entire body and area of the screen pervious to paint. Screen S2, however, is opaqued over the marginal line 9.

Thus it will be observed that the screens S, S', S1 and S2 for the colors yellow, red, white and black are made successively from the same negative, and in the reverse order of the color sequence established at the beginning of the operation.

Figure 17:
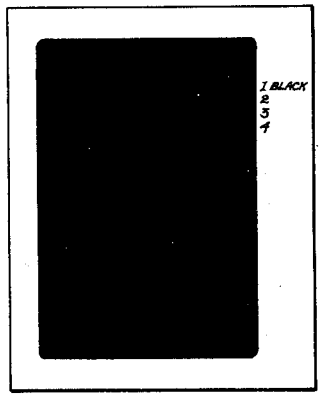
Fig. 17 is a print made from the stencil of Fig. 16.
Figure 18:
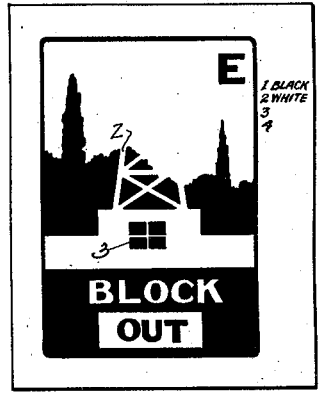
Fig. 18 is a print of the stencil in Fig. 13 made over Fig. 17.
Figure 19:
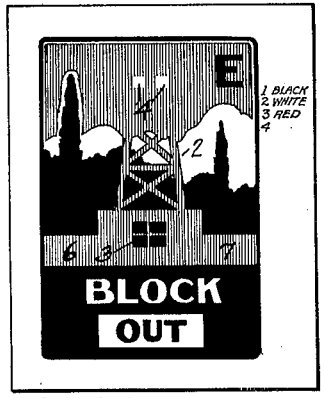
Fig. 19 is a print of the stencil in Fig. 10 made over the print in Fig. 18.
Figure 20:
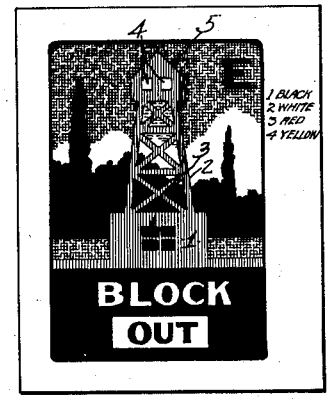
Fig. 20 is a print from the stencil shown in Fig. 7 over the print shown in Fig. 19, which corresponds exactly to the colored original of Fig. 1.

The printing of the colors from said screens is done in the previously determined color order, as shown in Figs. 17, 18, 19, and 20. The black being the first color of the order, is printed first and forms a background for the other colors, as shown in Fig. 17. Said print is made from screen S2. The color white is next applied over the black through screen S1, and the result of the second operation is shown in Fig. 18. Red is then applied through screen S' and forms a print such as is shown in Fig. 19. The final color yellow is now applied over all of the other colors through screen S, and the result is shown in Fig. 20 as an exact counterpart of the colored original of Fig. 1. It will be noted that in a four color design such as is shown in Fig. 1 it is necessary to block out portions of the design on the negative for but two of the colors and the same is true of the screens S1 and S2. The blocking out shown in the drawings is only incidental where there is a margin shown around the design of a color corresponding to the background. Thus there is a minimum of blocking out necessary for the single negative and for the screens, as well. Furthermore the blocking out is done the reverse of the usual methods and no great caution is necessary except where the colors abut or overlap.

Photographic negatives may be used in connection with my method with as good results as the Van Dyke negatives, but the latter are more economical and serve to greatly facilitate the printing operations. All of the screens being made from the same negative insures perfect registration of the colors on the posters and eliminates the necessity for the usual color separation lines.

It will be readily apparent to those familiar with color printing methods that I have provided a simple, efficient and economical method of printing posters and the like, and that the method herein described is subject to modification and change to meet the requirements of varying usage.

What I claim is:

1. The method of reproducing designs from a colored original which consists in making a positive tracing of all of the colored areas on the original, making a single negative from said tracing, blocking out in opaque paint on the negative, one color after another in accordance with a previously determined color sequence, making successive prints on screens from the same negatives for the colors in order, blocking out on the screens the areas of the preceding colors in order, and printing the colors, one upon another through said screens.

2. The method of reproducing designs from a colored original which consists in tracing on a transparent sheet of material in opaque paint the areas of the several colors in the order of a predetermined color sequence, making a single negative from the composite tracing, making a print on a screen from said negative, blocking out in impervious paint on said screen all pervious portions except those covering the areas of the final color of the sequence, thereafter alternately blocking out in opaque paint on said negative and impervious paint on successive screens for the remaining colors of the sequence, for making the color screens inversely of the printing order.

3. The method of reproducing designs from a colored original which consists in making a single tracing in opaque paint on a transparent sheet of material of the several colors of the original without regard to accuracy of detail, making a single negative therefrom, retouching said negative for correcting inaccuracies and sharpening the outlines, making separate prints on screens from the same negative in the reverse order of a predetermined color sequence, blocking out on the negative after the printing of each screen portions corresponding to the next color in order, and blocking out on the screens before printing therefrom the pervious portions representing selected colors not to be printed by the screens, respectively.

4. The method of reproducing designs from a colored original which consists in making a positive tracing from the colored original in opaque paint, making a single negative from the tracing, making a plurality of photographic prints on sensitized screens from said negative, and blocking out on the negative and portions of the screens areas that are to be impervious to paint and that correspond respectively to the different colors.

5. The method of reproducing designs from a colored original which consists in making a tracing on transparent material in opaque paint of the original without exactitude and accuracy in detail, making a negative from said tracing, correcting the inaccuracies on said negative, making a plurality of prints on sensitized screens from said negative, blocking out on said negative portions that correspond respectively to the different colors, and blocking out on said screens also portions that correspond to the colors.

6. The method of reproducing designs from a colored original which consists in making a crude tracing on transparent material in opaque paint of a colored original, making a single negative from said tracing, retouching said negative to correct inaccuracies, making a plurality of prints on sensitized screens in the reverse of the established printing order, and blocking out on said negative and on said screens portions corresponding to the different colors.

7. The method of reproducing designs from a colored original which consists in making an opaque tracing of the colored original, making a negative from said tracing, making a plurality of prints on sensitized screens from said negative in the reverse of the printing order, blocking out portions on said negative, and portions on said screens corresponding to the following colors of the printing order.

8. The method of reproducing designs from a colored original which consists in making a drawing in opaque paint of the colored original on transparent material, making a single negative from said drawing, making a plurality of prints on sensitized screens from the same negative, blocking out on the negative portions corresponding to certain colors in the printing order, and blocking out on the screens, portions that are to be impervious to paint, and that correspond to the certain colors of the printing order.

9. The method of reproducing designs from a colored original, which consists in making a drawing in opaque paint of the colored original, making a negative from said drawing, alternately blocking out portions on said negative corresponding to the different colors and making prints on sensitized screens therefrom, and blocking out portions of said screens that correspond to preceding colors of the printing order.

10. The method of reproducing designs from a colored original which consists in making an opaque drawing on transparent material of a colored original, omitting attention to details in said drawing, making a negative from said drawing, retouching and supplying the omitted details on the negative, making a plurality of prints on sensitized screens from said negative, and blocking out portions on said screens corresponding to the different colors.

11. The method of reproducing designs from a colored original which consists in making an opaque drawing of the colored original on transparent material, making a negative from said drawing, making a plurality of prints on sensitized screens from said negative in the reverse of the printing order for the several colors, and blocking out on the negative and on the screens different portions which correspond to colors of the printing order previous to those for which the screens are to be used.

12. The method of reproducing designs from a colored original which consists in copying on a sheet of material in opaque, the design of the colored original, making a negative on paper from said copy, making a plurality of prints on sensitized screens from said negative, blocking out on said negative portions corresponding to the different colors, and blocking out on the screens, portions corresponding to previous colors in the printing order.

13. The method of reproducing designs from a colored original, which consists in making a drawing in opaque paint, from the colored original, attaching a transparent strip bearing a feature of the design to the drawing, making a negative from the drawing and strip, making prints on sensitized screens from said negative, and blocking out portions of said negative and portions of said screens, corresponding to the sequence of the colors in the printing order.

14. The method of reproducing designs from a colored original which consists in making a drawing in opaque paint on transparent material of the colored original, making a negative from said drawing, making a plurality of prints on sensitized screens from the same negative and in the reverse of the order in which the colors are to be printed, and blocking out portions of said negative and portions of said screens corresponding to the sequence of the colors in the printing order.

15. The method of reproducing designs from a colored original which consists in making a drawing in opaque paint on transparent material of the colored original without allowing the color areas to overlap or abut, making a negative from said drawing, making a plurality of prints on sensitized screens from said negative in the reverse of the printing order, and blocking out portions of said negative and portions of said screens corresponding to the sequence of the colors in the printing order.

16. The method of reproducing designs from a colored original which consists in making a drawing of the colored original in opaque paint without allowing the different color areas to abut or overlap, retouching the negative to correct defects and inaccuracies, making a plurality of prints on sensitized screens representative of the several colors and in the reverse of the order the colors are to be printed, and blocking out portions on said negative and portions on said screens which correspond to previous colors of the printing order.

17. The method of reproducing designs from a colored original which consists in making a drawing in opaque paint of the colored original, making a negative from said drawing, making a plurality of prints on sensitized screens from said negative in a sequence, the reverse of the printing order for the colors, blocking out portions on the negative, that are not already opaque, blocking out on the screens portions that are to be impervious to paint, and printing from said screens the colors in the printing order.

18. The method of reproducing designs from a colored original which consists in making a drawing in opaque paint of the colored original without abutting or overlapping the different color areas, making a negative from said drawing, making a plurality of prints from said negative on sensitized screens for the several colors of the original, blocking out portions of the screens corresponding to the previous colors in the printing order, and printing the colors in order through said screens.

FRANK HART.